(12) United States Patent
Kong et al.

(10) Patent No.: US 12,027,736 B2
(45) Date of Patent: Jul. 2, 2024

(54) MEMBRANE-ELECTRODE ASSEMBLY CAPABLE OF IMPROVING REVERSE VOLTAGE DURABILITY OF FUEL CELL, METHOD FOR MANUFACTURING SAME, AND FUEL CELL INCLUDING SAME

(71) Applicant: KOLON INDUSTRIES, INC., Seoul (KR)

(72) Inventors: Nak Won Kong, Seoul (KR); Kyoung Sik Nam, Seoul (KR); Kah Young Song, Seoul (KR); Jun Young Kim, Seoul (KR)

(73) Assignee: Kolon Industries, Inc., Seoul (KR)

( * ) Notice: Subject to any disclaimer, the term of this patent is extended or adjusted under 35 U.S.C. 154(b) by 286 days.

(21) Appl. No.: 17/774,147

(22) PCT Filed: Dec. 23, 2020

(86) PCT No.: PCT/KR2020/019002
§ 371 (c)(1),
(2) Date: May 4, 2022

(87) PCT Pub. No.: WO2021/137517
PCT Pub. Date: Jul. 8, 2021

(65) Prior Publication Data
US 2022/0393211 A1 Dec. 8, 2022

(30) Foreign Application Priority Data
Dec. 31, 2019 (KR) .................. 10-2019-0179673

(51) Int. Cl.
*H01M 8/1004* (2016.01)
*H01M 4/86* (2006.01)
*H01M 4/92* (2006.01)

(52) U.S. Cl.
CPC ......... *H01M 8/1004* (2013.01); *H01M 4/926* (2013.01); *H01M 2004/8684* (2013.01)

(58) Field of Classification Search
CPC ... H01M 8/1004; H01M 8/0258; H01M 4/926
See application file for complete search history.

(56) References Cited

U.S. PATENT DOCUMENTS
2018/0212264 A1  7/2018  Kim

FOREIGN PATENT DOCUMENTS
CN     1853295 A    10/2006
CN   101026241 A     8/2007
(Continued)

OTHER PUBLICATIONS

The references cited in the office action dated Oct. 11, 2023 related to the corresponding Chinese Patent application are as follows.
(Continued)

*Primary Examiner* — Sarah A. Slifka
(74) *Attorney, Agent, or Firm* — Harvest IP Law, LLP

(57) ABSTRACT

Disclosed is a membrane-electrode assembly which can prevent the corrosion of a carbon-based carrier caused by reducing and/or stopping the supply of hydrogen gas, as well as platinum loss caused by such corrosion, without degrading the performance of a fuel cell, and thus can improve the reverse voltage durability of the fuel cell. Also disclosed are a method for manufacturing the membrane-electrode assembly, and a fuel cell including the membrane-electrode assembly. The membrane-electrode assembly according to the present invention includes: an electrolyte membrane having a first surface and a second surface opposite the first surface; an anode on the first surface; an OER catalyst layer on the first surface; and a cathode on the second surface, wherein the OER catalyst layer includes a catalyst for an oxygen-
(Continued)

generating reaction, and at least a portion of the OER catalyst layer is disposed on the same layer as the anode.

12 Claims, 3 Drawing Sheets

(56) References Cited

FOREIGN PATENT DOCUMENTS

| | | | |
|---|---|---|---|
| CN | 101409354 | A | 4/2009 |
| CN | 101425585 | A | 5/2009 |
| CN | 106104885 | A | 11/2016 |
| JP | 2011-216380 | A | 10/2011 |
| JP | 2015162309 | A | 9/2015 |
| JP | 6229925 | B2 | 11/2017 |
| JP | 2018503942 | A | 2/2018 |
| JP | 2018101533 | A | 6/2018 |
| JP | 2019532460 | A | 11/2019 |
| KR | 20150114555 | A | 10/2015 |
| KR | 20150120377 | A | 10/2015 |

OTHER PUBLICATIONS the office action dated may 14, 2024 related to the corresponding Korean Patent application.

MEMBRANE-ELECTRODE ASSEMBLY CAPABLE OF IMPROVING REVERSE VOLTAGE DURABILITY OF FUEL CELL, METHOD FOR MANUFACTURING SAME, AND FUEL CELL INCLUDING SAME

CROSS REFERENCE TO RELATED APPLICATIONS

This application is a National Stage of International Application No. PCT/KR2020/019002 filed Dec. 23, 2020, claiming priority based on Korean Patent Application No. 10-2019-0179673 filed Dec. 31, 2019, the disclosures of which are incorporated herein by reference in their entireties.

TECHNICAL FIELD

The present disclosure relates to a membrane-electrode assembly for fuel cells, a method of manufacturing the same, and a fuel cell including the same, and more particularly to a membrane-electrode assembly capable of preventing corrosion of a carbon-based support and thus loss of platinum due to a decrease in supply and/or an interruption in supply of hydrogen gas without degradation in power performance of a fuel cell, thereby improving reversal tolerance of the fuel cell, a method of manufacturing the same, and a fuel cell including the same.

BACKGROUND ART

A polymer electrolyte membrane fuel cell (PEMFC), which is configured to generate electricity using a structure in which unit cells, each of which includes a membrane-electrode assembly (MEA) and a separator (also referred to as a bipolar plate), are stacked, has attracted attention as a next-generation energy source capable of replacing fossil fuels due to high energy efficiency and environmentally friendly characteristics thereof.

The membrane-electrode assembly generally includes an anode (also referred to as a fuel electrode), a cathode (also referred to as an air electrode), and a polymer electrolyte membrane therebetween.

When fuel such as hydrogen gas is supplied to the anode, hydrogen ions ($H^+$) and electrons ($e^-$) are generated at the anode as the result of hydrogen oxidation reaction. The generated hydrogen ions are transported to the cathode via the polymer electrolyte membrane, and the generated electrons are transported to the cathode via an external circuit. Oxygen supplied to the cathode is bonded with the hydrogen ions and the electrons, and water is generated as the result of reduction.

A catalyst having a plurality of metal particles (e.g. platinum-based nanoparticles) dispersed on a carbon-based support is the most generally used to manufacture an anode and a cathode.

There are (i) hydrogen oxidation reaction (HOR) occurring during normal supply of hydrogen gas, represented by Reaction Formula 1 below, and (ii) carbon oxidation reaction (COR) occurring when the supply of hydrogen gas is reduced or interrupted due to lack of fuel, represented by Reaction Formula 2 and/or Reaction Formula 3 below, as reactions occurring at the anode.

$2H_2 \rightarrow 4H^+ + 4e^-$ 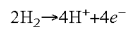 [Reaction Formula 1]

$C + 2H_2O \rightarrow CO_2 + 4H^+ + 4e^-$ 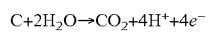 [Reaction Formula 2]

$C + H_2O \rightarrow CO + 2H^+ + 2e^-$  [Reaction Formula 3]

Carbon oxidation reaction (COR) corrodes the carbon-based support, thereby causing loss of a metal of a catalyst for hydrogen oxidation reaction (HOR) (hereinafter referred to as an HOR catalyst) and degradation of the anode due thereto.

A method of using a catalyst capable of inducing oxygen evolution reaction (OER), represented by Reaction Formula 4 below, thereby inhibiting carbon oxidation reaction (COR) (hereinafter referred to as an OER catalyst), has been proposed as a method of inhibiting carbon oxidation reaction (COR). The OER catalyst maintains low voltage of the anode, whereby it is possible to prevent corrosion of a carbon-based support and loss of a catalyst metal due thereto.

$2H_2O \rightarrow O_2 + 4H^+ + 4e^-$ 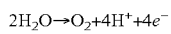 [Reaction Formula 4]

According to conventional arts proposing introduction of the OER catalyst, (i) the OER catalyst exists in the anode together with the HOR catalyst, (ii) the OER catalyst exists in a separate layer disposed between the anode and the polymer electrolyte membrane, or (iii) the OER catalyst exists in a separate layer disposed between the anode and a gas diffusion layer (GDL).

When the OER catalyst exists in the anode together with the HOR catalyst, however, a metal of the OER catalyst (e.g. Ir or Ru) is located in the vicinity of a metal (e.g. Pt) of the HOR catalyst, whereby catalyst activity of the metal of the HOR catalyst is adversely affected. As a result, hydrogen oxidation reaction (HOR) at the anode is weakened, whereby overvoltage is applied to the anode when hydrogen is oxidized at the anode, and therefore power performance of the fuel cell is lowered. In particular, when the OER catalyst is an oxide, electrical conductivity is lowered, and therefore power performance of the fuel cell is further lowered.

Disposing a separate OER catalyst layer between the anode and the polymer electrolyte membrane or between the anode and the GDL is also not preferable in that proton transport resistance is increased (when the OER catalyst layer is disposed between the anode and the polymer electrolyte membrane) or electron transport resistance is increased (when the OER catalyst layer is disposed between the anode and the GDL) due to the OER catalyst layer, whereby the output of the fuel cell is lowered.

DISCLOSURE

Technical Problem

Therefore, the present disclosure relates to a membrane-electrode assembly capable of preventing problems caused by limitations and shortcomings of the related art described above, a method of manufacturing the same, and a fuel cell including the same.

It is an object of the present disclosure to provide a membrane-electrode assembly capable of preventing corrosion of a carbon-based support and thus loss of platinum due to a decrease in supply and/or an interruption in supply of hydrogen gas without degradation in power performance of a fuel cell, thereby improving reversal tolerance of the fuel cell.

It is another object of the present disclosure to provide a method for manufacturing a membrane-electrode assembly capable of preventing corrosion of a carbon-based support and thus loss of platinum due to a decrease in supply and/or an interruption in supply of hydrogen gas without degradation in power performance of a fuel cell, thereby improving reversal tolerance of the fuel cell.

It is a further object of the present disclosure to provide a fuel cell having high power performance and excellent reversal tolerance.

In addition to the above objects, other features and advantages of the present disclosure will be described hereinafter, or will be clearly understood by those skilled in the art to which the present disclosure pertains from the following description thereof.

Technical Solution

In accordance with an aspect of the present disclosure, there is provided a membrane-electrode assembly including an electrolyte membrane having a first surface and a second surface opposite the first surface, an anode on the first surface, an OER catalyst layer on the first surface, and a cathode on the second surface, wherein the OER catalyst layer includes an oxygen evolution reaction catalyst, the OER catalyst layer is in contact with the anode, and at least a portion of the OER catalyst layer does not overlap the anode in a thickness direction of the OER catalyst layer.

The oxygen evolution reaction catalyst may include $IrO_2$, $RuO_2$, $TiO_2$, $Ir_xSn_{1-x}O_2$ (x being a real number greater than 0 and less than 1), PtIr, IrRu, PtRuIr, or a mixture of two or more thereof.

The oxygen evolution reaction catalyst may be supported on a carbon-based support.

The anode may include no oxygen evolution reaction catalyst.

The anode may have a size and a shape corresponding to the cathode.

The entirety of the OER catalyst layer may not overlap the anode in the thickness direction thereof.

The OER catalyst layer and the anode may be arranged side by side on the first surface.

The OER catalyst layer may be disposed on the first surface so as to surround the anode.

In accordance with another aspect of the present disclosure, there is provided a method for manufacturing a membrane-electrode assembly, the method including preparing an electrolyte membrane having a first surface and a second surface opposite the first surface, forming an anode on the first surface, forming an OER catalyst layer on the first surface, and forming a cathode on the second surface, wherein the OER catalyst layer includes an oxygen evolution reaction catalyst, the OER catalyst layer is in contact with the anode, and at least a portion of the OER catalyst layer does not overlap the anode in a thickness direction of the OER catalyst layer.

The step of forming the anode on the first surface may include forming the anode on a first release film and transferring the anode formed on the first release film to a first region of the first surface, the step of forming the OER catalyst layer on the first surface may include forming the OER catalyst layer on a second release film and transferring the OER catalyst layer formed on the second release film to a second region of the first surface, and the step of forming the cathode on the second surface may include forming the cathode on a third release film and transferring the cathode formed on the third release film to the second surface.

The transferring of the anode, the transferring of the OER catalyst layer, and the transferring of the cathode may be simultaneously performed.

In accordance with a further aspect of the present disclosure, there is provided a fuel cell including the membrane-electrode assembly and a separator disposed on the anode and the OER catalyst layer, wherein the separator has a fuel inlet, a fuel outlet, and a flow channel between the fuel inlet and the fuel outlet, and the OER catalyst layer overlaps at least one of the fuel inlet and the fuel outlet.

The general description of the present disclosure given above is provided merely to illustrate or describe the present disclosure, and does not limit the scope of rights of the present disclosure.

Advantageous Effects

According to the present disclosure, an OER catalyst layer capable of inducing oxygen evolution reaction (OER), thereby inhibiting carbon oxidation reaction (COR) at an anode is formed so as to contact the anode while most of the OER catalyst layer does not overlap the anode, whereby it is possible to prevent corrosion of a carbon-based support and thus loss of platinum due to a decrease in supply and/or an interruption in supply of hydrogen gas without degradation in power performance of a fuel cell, and therefore it is possible to remarkably improve reversal tolerance of the fuel cell.

DESCRIPTION OF DRAWINGS

The accompanying drawings, which are included to assist in understanding of the present disclosure and are incorporated in and constitute a part of the present specification, illustrate embodiments of the present disclosure and serve to explain the principle of the present disclosure together with the detailed description of the present disclosure.

BEST MODE

Hereinafter, embodiments of the present disclosure will be described in detail with reference to the accompanying drawings. However, the following embodiments are illustratively provided merely for clear understanding of the present disclosure and do not limit the scope of the present disclosure.

FIGS. 1(a) and 1(b) are respectively a plan view and a sectional view of a membrane-electrode assembly 100 according to an embodiment of the present disclosure.

Figure 1:
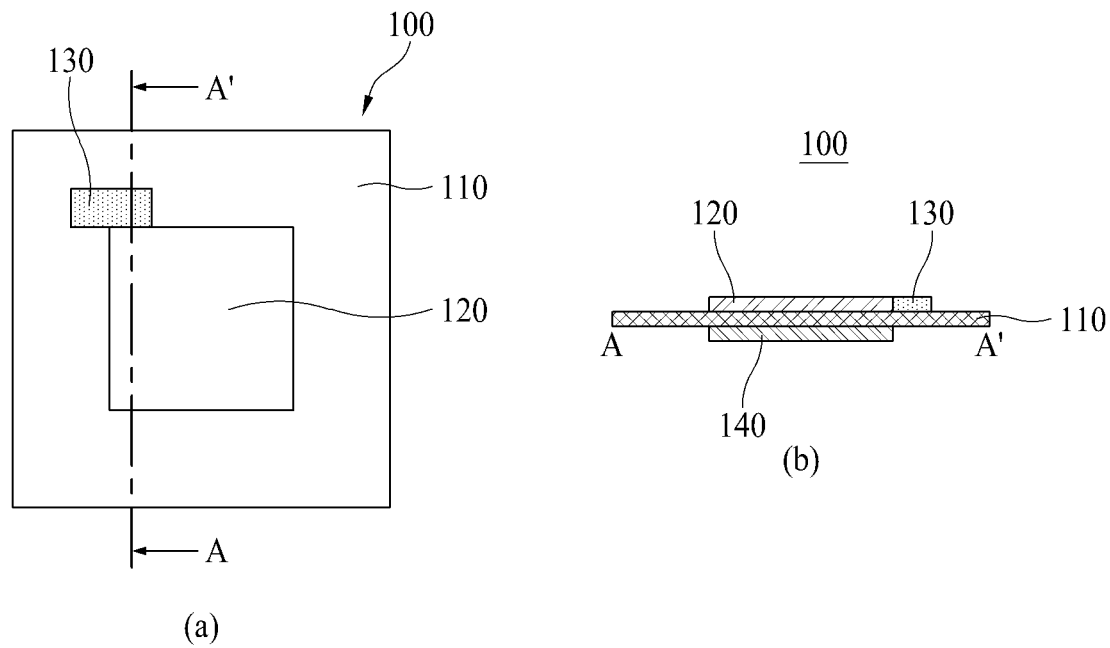
FIGS. 1(a) and 1(b) are respectively a plan view and a sectional view of a membrane-electrode assembly according to an embodiment of the present disclosure.

As illustrated in FIG. 1, the membrane-electrode assembly 100 according to the present disclosure includes an electrolyte membrane 110 having a first surface and a second surface, which is opposite the first surface, an anode 120 on the first surface, an OER catalyst layer 130 on the first surface, and a cathode 140 on the second surface.

The electrolyte membrane 110 may be a single membrane type electrolyte membrane formed of an ionomer or a reinforced composite membrane type electrolyte membrane including a porous support impregnated with an ionomer.

In both the two types of electrolyte membranes 110, the ionomer may be a fluorine-based ionomer or a hydrocarbon-based ionomer, and may have at least one ionic conductivity group selected from the group consisting of a sulfonic acid group, a carboxyl group, a boronic acid group, a phosphate group, an imide group, a sulfonimide group, a sulfonamide group, and a sulfonic acid fluoride group.

For example, the ionomer may be a fluorine-based ionomer, such as poly(perfluorosulfonic acid) or poly(perfluorocarboxylic acid).

Alternatively, the ionomer may be a hydrocarbon-based ionomer, such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, or sulfonated polyarylene ether sulfone ketone.

The porous support that may be used in the reinforced composite membrane type electrolyte membrane 110 may be formed of polytetrafluoroethylene (PTFE), or may be formed of a copolymer of tetrafluoroethylene and $CF_2=CFC_nF_{2n+1}$ (n being a real number of 1 to 5) or $CF_2=CFO-(CF_2CF(CF_3)O)_mC_nF_{2n+1}$ (m being a real number of 0 to 15 and n being a real number of 1 to 15). For example, PTFE may be extruded onto tape under the presence of a lubricant and then an expansion process and a heat treatment process may be performed to form an expanded film type e-PTFE porous support. After the heat treatment process, an additional expansion process and an additional heat treatment process may be further performed. The expansion and heat treatment processes may be controlled to form various microstructured e-PTFE porous supports. For example, the e-PTFE porous support may have a microstructure in which nodes are connected to each other by fibrils or a microstructure constituted by only fibrils.

Alternatively, the porous support may be a nonwoven web. The nonwoven web may be formed of a support formation solution including at least one hydrocarbon-based polymer selected from the group consisting of polyolefin (e.g. polyethylene, polypropylene, or polybutylene), polyester (e.g. PET or PBT), polyamide (e.g. nylon-6, nylon-6,6, or aramid), polyamic acid (molded into a web and then transformed into polyimide through an imidation process), polyurethane, polybutene, polylactic acid, polyvinyl alcohol, polyphenylene sulfide (PPS), polysulfone, a fluid crystalline polymer, polyethylene-co-vinyl acetate, polyacrylonitrile, cyclic polyolefin, polyoxymethylene, and a polyolefin-based thermoplastic elastomer.

The nonwoven web may be manufactured using a method selected from the group consisting of wet-laying, electrospinning, carding, garneting, air-laying, melt blowing, spun bonding, and stitch bonding.

The anode 120 may be formed using an electrode-forming dispersion manufactured by dispersing a catalyst for hydrogen oxidation reaction (HOR) (i.e. an HOR catalyst) in a dispersion medium together with an ionomer.

The HOR catalyst may include a support and a plurality of metal particles dispersed on the support.

The support may be (i) a carbon-based support, (ii) a porous inorganic oxide support, such as zirconia, alumina, titania, silica, or ceria, or (iii) a zeolite support.

The carbon-based support may be graphite, super P, carbon fiber, carbon sheet, carbon black, Ketjen black, Denka black, acetylene black, carbon nanotube (CNT), carbon sphere, carbon ribbon, fullerene, active carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, or a combination of two or more thereof.

The metal particles may be platinum (Pt) particles or platinum-based alloy particles.

The platinum-based alloy may be Pt—Pd, Pt—Mn, Pt—Sn, Pt—Mo, Pt—W, Pt—Ru, Pt—Ru—W, Pt—Ru—Ni, Pt—Ru—Mo, Pt—Ru—Rh—Ni, Pt—Ru—Sn—W, Pt—Ru—Ir—Ni, Pt—Co, Pt—Co—Mn, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, or Pt—Cr—Ir.

The ionomer dispersed in the dispersion medium together with the HOR catalyst is provided to transport cations, and also performs the function of a binder that increases the force of adhesion between the anode 120 and the electrolyte membrane 110.

The ionomers that may be used to form the electrolyte membrane 110 may also be used to form the anode 120. It is preferable for the ionomer of the electrolyte membrane 110 and the ionomer of the anode 120 to be of the same kind. However, the present disclosure is not limited thereto. Different kinds of ionomers may be used to manufacture the electrolyte membrane 110 and the anode 120.

The dispersion medium of the electrode-forming dispersion may be ethanol, distilled water, isopropyl alcohol, normal propyl alcohol, butanol, or a mixture of two or more thereof.

The HOR catalyst may be used as a catalyst for oxygen reduction reaction, and therefore the electrode-forming dispersion that may be used to form the anode 120 may also be used to form the cathode 140.

The anode 120 and the cathode 140 may be formed respectively on the first surface and the second surface of the electrolyte membrane 110 by decal transfer or direct coating.

In an embodiment of the present disclosure, the anode 120 may have a size and a shape corresponding to the cathode 140 such that each of the anode 120 and the cathode 140 can be entirely utilized to generate electricity. Preferably, the anode 120 and the cathode 140 substantially completely overlap each other.

The OER catalyst layer 130 according to the present disclosure includes an oxygen evolution reaction catalyst (i.e. an OER catalyst). The oxygen evolution reaction catalyst may include $IrO_2$, $RuO_2$, $TiO_2$, $Ir_xSn_{1-x}O_2$ (x being a real number greater than 0 and less than 1), PtIr, IrRu, PtRuIr, or a mixture of two or more thereof.

The oxygen evolution reaction catalyst may have a particle shape, and may be supported on a carbon-based support. The carbon-based support may be graphite, super P, carbon fiber, carbon sheet, carbon black, Ketjen black, Denka black, acetylene black, carbon nanotube (CNT), carbon sphere, carbon ribbon, fullerene, active carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, or a combination of two or more thereof.

The OER catalyst layer 130 may be formed using an OER-catalyst-layer-forming dispersion manufactured by dispersing the oxygen evolution reaction catalyst in a dispersion medium together with an ionomer.

The ionomer dispersed in the dispersion medium together with the oxygen evolution reaction catalyst is provided to transport cations, and also performs the function of a binder that increases the force of adhesion between the OER catalyst layer 130 and the electrolyte membrane 110.

The ionomers that may be used to form the electrolyte membrane 110 may also be used to form the OER catalyst layer 130. It is preferable for the ionomer of the electrolyte membrane 110 and the ionomer of the OER catalyst layer 130 to be of the same kind. However, the present disclosure is not limited thereto. Different kinds of ionomers may be used to manufacture the electrolyte membrane 110 and the OER catalyst layer 130.

The dispersion medium of the OER-catalyst-layer-forming dispersion may be ethanol, distilled water, isopropyl alcohol, normal propyl alcohol, butanol, or a mixture of two or more thereof.

The OER catalyst layer 130 may be formed on the first surface of the electrolyte membrane 110 by decal transfer or direct coating.

As illustrated in FIG. 1, the OER catalyst layer 130 according to the present disclosure is arranged on the first surface of the electrolyte membrane 110 so as to contact the anode 120 while at least a portion thereof does not overlap the anode 120 in a thickness direction thereof.

According to the present disclosure, the OER catalyst layer 130, which is capable of inducing oxygen evolution reaction (OER) to inhibit carbon oxidation reaction (COR) at the anode, is formed so as to contact the anode 120, whereby it is possible to prevent carbon oxidation reaction (COR), which causes corrosion of the carbon-based support and loss of platinum due thereto, from occurring at the anode 120 even when the supply of hydrogen gas is reduced or interrupted due to lack of fuel.

In addition, according to the present disclosure, the entirety of the OER catalyst layer 130 is arranged on the first surface of the electrolyte membrane 110 so as not to substantially overlap the anode in the thickness direction thereof, whereby it is possible to prevent the oxygen evolution reaction catalyst from being included in the anode 120, and therefore it is possible to prevent or minimize lowering in activity of the HOR catalyst of the anode 120 due to the oxygen evolution reaction catalyst, and it is possible to prevent an increase in proton/electron transport resistance of the membrane-electrode assembly 100 due to the OER catalyst layer 130. As a result, according to the present disclosure, it is possible to remarkably improve reversal tolerance of a fuel cell without power performance degradation.

That the entirety of the OER catalyst layer 130 does not substantially overlap the anode is a concept that encompasses that the OER catalyst layer 130 unintentionally slightly overlaps the anode 120 due to a process error as well as that the OER catalyst layer 130 does not overlap the anode 120 at all in the thickness direction thereof.

Figure 3:
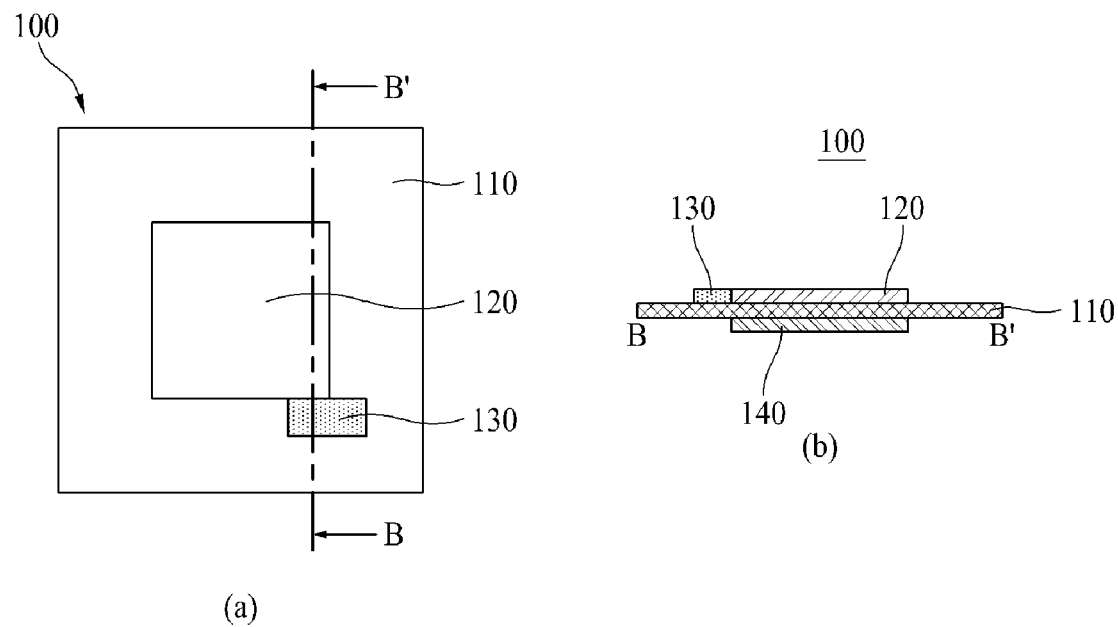
FIGS. 3(a) and 3(b) are respectively a plan view and a sectional view of a membrane-electrode assembly according to another embodiment of the present disclosure.
Figure 5:
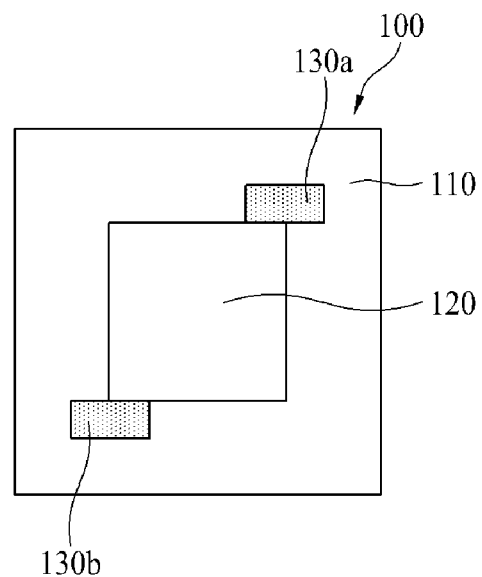
FIG. 5 is a plan view of a membrane-electrode assembly according to yet another embodiment of the present disclosure.

For example, as illustrated in FIGS. 1, 3, and 5, a single OER catalyst layer 130 or first and second OER catalyst layers 130a and 130b formed spaced apart from each other may be disposed on the first surface of the electrolyte membrane 110 so as to be arranged with the anode 120 side by side.

Figure 6:
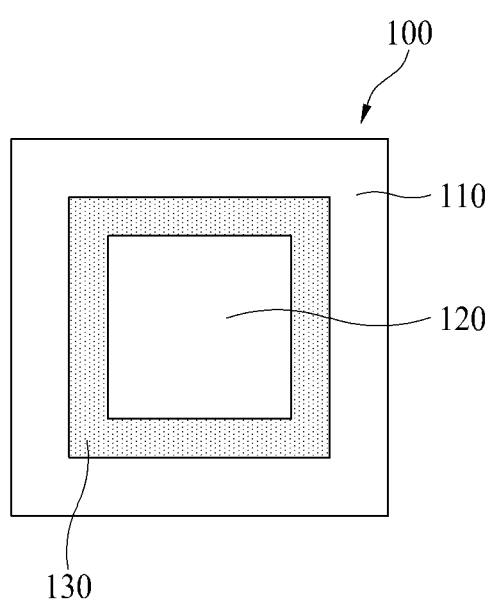
FIG. 6 is a plan view of a membrane-electrode assembly according to a further embodiment of the present disclosure.

Alternatively, as illustrated in FIG. 6, the OER catalyst layer 130 according to the present disclosure may be disposed on the first surface of the electrolyte membrane 110 so as to surround the anode 120.

Hereinafter, a method of manufacturing a membrane-electrode assembly 100 according to embodiments of the present disclosure will be described in detail.

The method according to the present disclosure includes a step of preparing an electrolyte membrane 110 having a first surface and a second surface, which is opposite the first surface, a step of forming an anode 120 on the first surface, a step of forming an OER catalyst layer 130 on the first surface, and a step of forming a cathode 140 on the second surface.

The OER catalyst layer 130 includes the oxygen evolution reaction catalyst, and is formed on the first surface of the electrolyte membrane 110 so as to contact the anode 120 while at least a portion thereof does not overlap the anode 120.

As previously described, each of the anode 120, the OER catalyst layer 130, and the cathode may be formed on the first surface or the second surface of the electrolyte membrane 110 by decal transfer or direct coating.

In an embodiment of the present disclosure, the anode 120 is formed on the first surface of the electrolyte membrane 110 by decal transfer. For example, the electrode-forming dispersion is applied to a first release film and is then dried to form the anode 120. At this time, a mask film having an opening may be used, and the size and the shape of the anode 120 are determined based on the size and the shape of the opening of the mask film. Subsequently, the anode 120 formed on the first release film may be transferred to a first region of the first surface of the electrolyte membrane 110.

In an embodiment of the present disclosure, the OER catalyst layer 130 is also formed on the first surface of the electrolyte membrane 110 by decal transfer. For example, the OER-catalyst-layer-forming dispersion is applied to a second release film and is then dried to form the OER catalyst layer 130. In the same manner, a mask film may be used when the OER-catalyst-layer-forming dispersion is applied to the second release film, and the size and the shape of the OER catalyst layer 130 are determined based on the size and the shape of an opening of the mask film. Subsequently, the OER catalyst layer 130 formed on the second release film may be transferred to a second region of the first surface of the electrolyte membrane 110.

In an embodiment of the present disclosure, the cathode 140 is also formed on the second surface of the electrolyte membrane 110 by decal transfer. For example, the electrode-forming dispersion is applied to a third release film and is then dried to form the cathode 140. In the same manner, a mask film may be used. Subsequently, the cathode 140 formed on the third release film may be transferred to the second surface of the electrolyte membrane 110.

In an embodiment of the present disclosure, transfer of the anode 120, transfer of the OER catalyst layer 130, and transfer of the cathode 140 may be simultaneously performed.

In another embodiment of the present disclosure, transfer of the anode 120 and transfer of the cathode 140 may be simultaneously performed, and then transfer of the OER catalyst layer 130 may be performed.

In yet another embodiment of the present disclosure, transfer of the OER catalyst layer 130 may be performed first, and then transfer of the anode 120 and transfer of the cathode 140 may be simultaneously performed.

Hereinafter, a fuel cell according to embodiments of the present disclosure will be described in detail.

Figure 2:
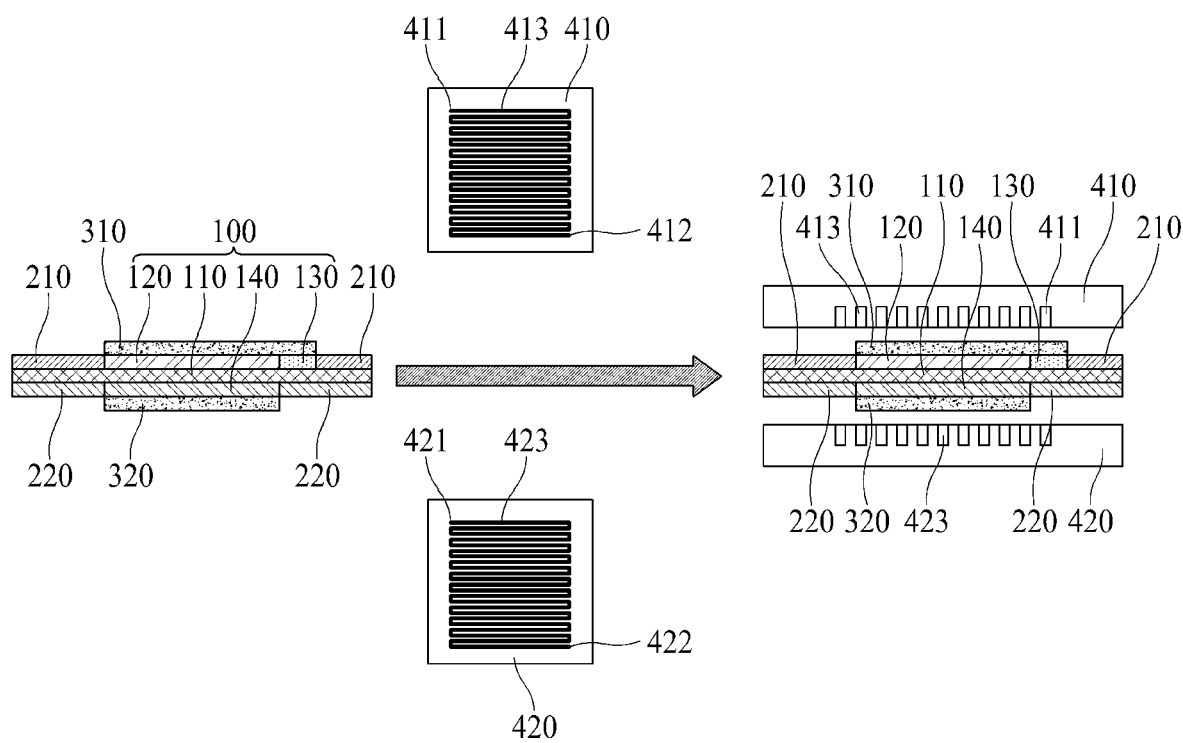
FIG. 2 is sectional views showing a process of manufacturing a fuel cell according to an embodiment of the present disclosure.

As illustrated in FIG. 2, the fuel cell according to the present disclosure includes the membrane-electrode assembly 100 of FIG. 1 and a first separator 410 disposed on the anode 120 and the OER catalyst layer 130.

The first separator 410 has a fuel inlet 411, a fuel outlet 412, and a flow channel 413 between the fuel inlet 411 and the fuel outlet 412.

According to the present disclosure, the OER catalyst layer 130 of the membrane-electrode assembly 100 overlaps at least one of the fuel inlet 411 and the fuel outlet 412, whereby it is possible to maximize the amount of moisture supplied to the OER catalyst layer 130, and therefore it is possible to maximize reversal tolerance due to the OER catalyst layer 130.

Figure 4:
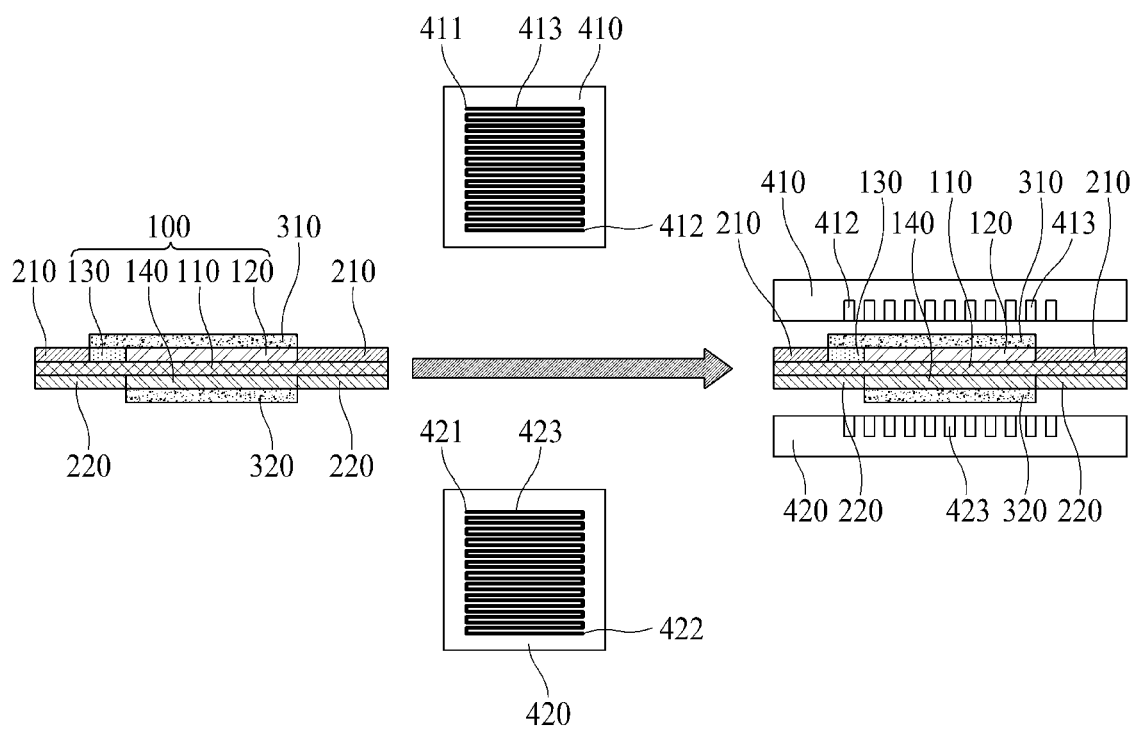
FIG. 4 is sectional views showing a process of manufacturing a fuel cell according to another embodiment of the present disclosure.

For example, (i) as illustrated in FIG. 2, the OER catalyst layer 130 may be arranged so as to overlap the fuel inlet 411, (ii) as illustrated in FIG. 4, the OER catalyst layer 130 may be arranged so as to overlap the fuel outlet 412, (iii) as illustrated in FIG. 5, a first OER catalyst layer 130a and a second OER catalyst layer 130b formed spaced apart from each other may be arranged so as to overlap the fuel inlet 411 and the fuel outlet 412, respectively, or (iv) an OER catalyst layer 130 formed so as to surround an anode 120 may be arranged so as to overlap both the fuel inlet 411 and the fuel outlet 412.

As illustrated in FIGS. 2 and 4, the fuel cell according to the present disclosure may further include a first sub-gasket 210 formed on the first surface of the electrolyte membrane 110 so as to surround the anode 120 and the OER catalyst layer 130, a second sub-gasket 220 formed on the second surface of the electrolyte membrane 110 so as to surround the cathode 140, a first gas diffusion layer 310 configured to cover the entirety of the anode 120 and at least a portion of the OER catalyst layer 130, a second gas diffusion layer 320 configured to cover the entirety of the cathode 140, a first separator 410 on the first gas diffusion layer 310, and a second separator 420 on the second gas diffusion layer 320. The second separator 420 has an air inlet 421, an air outlet 422, and a flow channel 423 between the air inlet 421 and the air outlet 422.

Hereinafter, the present disclosure will be described in detail with reference to concrete examples. However, the following examples are given merely to assist in understanding of the present disclosure, and do not limit the scope of rights of the present disclosure.

Example 1

An electrode-forming dispersion was prepared through a general method using a Pt/C catalyst, and an OER-catalyst-layer-forming dispersion was prepared using an $IrO_2$ OER catalyst.

The electrode-forming dispersion was applied to a first release film so as to have an area of 9 cm$^2$ (0.1 mg$_{Pt}$/cm$^2$) and was then dried in an oven at 60° C. for 8 hours to form an anode having a square shape, the OER-catalyst-layer-forming dispersion was applied to a second release film so as to have an area of 2 cm$^2$ (0.15 mg$_{Ir}$/cm$^2$) and was then dried in an oven at 60° C. for 8 hours to form an OER catalyst layer having a rectangular shape, and the electrode-forming dispersion was applied to a third release film so as to have an area of 9 cm$^2$ (0.4 mg$_{Pt}$/cm$^2$) and was then dried in an oven at 60° C. for 8 hours to form a cathode having a square shape.

Subsequently, each of the anode, the OER catalyst layer, and the cathode was stacked on a first surface or a second surface of an electrolyte membrane formed of perfluoro-sulfonic acid, as illustrated in FIG. 1, and was then thermally pressed to complete a membrane-electrode assembly. At this time, the OER catalyst layer was disposed so as to be located at a fuel inlet.

Example 1

A membrane-electrode assembly was manufactured using the same method as in Example 1 except that the OER catalyst layer was disposed so as to be located at a fuel outlet.

Comparative Example 1

A membrane-electrode assembly was manufactured using the same method as in Example 1 except that no OER catalyst layer was formed.

Comparative Example 2

A membrane-electrode assembly was manufactured using the same method as in Example 1 except that an electrode-forming dispersion containing a Pt/C catalyst and an $IrO_2$ OER catalyst at a weight ratio of Pt:Ir=3:1 was applied to a first release film so as to have an area of 9 cm$^2$ (0.12 mg$_{(Pt+Ir)}$/cm$^2$) and was then dried in an oven at 60° C. for 8 hours to form an anode having a square shape and that no OER catalyst layer was formed.

Comparative Example 3

A membrane-electrode assembly was manufactured using the same method as in Example 1 except that the OER-catalyst-layer-forming dispersion was applied to a second release film so as to have an area of 9 cm$^2$ (0.03 mg$_{Ir}$/cm$^2$) and was then dried in an oven at 60° C. for 8 hours to form an OER catalyst layer having a square shape, the OER catalyst layer was transferred to the first surface of the electrolyte membrane, the anode was transferred to the OER catalyst layer, and the cathode was transferred to the second surface of the electrolyte membrane, whereby the OER catalyst layer was located between the anode and the electrolyte membrane.

Reversal tolerance and voltage loss of each of the membrane-electrode assemblies obtained according to Examples and Comparative Examples were evaluated using the following methods, and the results are shown in Table 1.

Evaluation of Reversal Tolerance

Reversal tolerance of the membrane-electrode assembly was evaluated through a cell reversal test. Specifically, air (50% RH) was supplied to the cathode, nitrogen (50% RH) was supplied to the anode, and a current of 0.2 A/cm$^2$ was applied to measure cell reversal time $T_{CR}$ (−2.0V), which was a time taken until voltage reached −2.0 V. Longer cell reversal time means higher reversal tolerance.

Evaluation of Voltage Loss

In order to check power performance under actual fuel cell operating conditions, the membrane-electrode assembly was fastened to a fuel cell unit cell evaluation device, and the temperature of the membrane-electrode assembly was maintained at 65° C. Hydrogen (50% RH) and air (50% RH) were supplied respectively to the anode and the cathode in amount corresponding to Stoichiometry 1.2/2.0. Voltages when negative electrode current densities of 0.1 A/cm$^2$ and 1 A/cm$^2$ were applied were measured. Higher measured voltage indicates better performance.

TABLE 1

|  | Ex. 1 | Ex. 2 | Comp. Ex. 1 | Comp. Ex. 2 | Comp. Ex. 3 |
|---|---|---|---|---|---|
| Cell reversal time ($T_{CR}$, −2.0 V) (min.) | 227 | 221 | 2.17 | 124 | 168 |
| 0.1 A/cm² Voltage (V) | 0.82 | 0.815 | 0.82 | 0.78 | 0.79 |
| Voltage loss compared to Comp. Ex. 1 (mV) | 0 | −5 | — | −40 | −30 |
| 1 A/cm² Voltage (V) | 0.66 | 0.67 | 0.67 | 0.61 | 0.62 |
| Voltage loss comparedto Comp. Ex. 1 (mV) | −10 | 0 | — | −60 | −50 |

As shown in Table 1, it can be seen that the membrane-electrode assembly according to Comparative Example 1 showed very short cell reversal time, since no OER catalyst was included therein, whereas the membrane-electrode assemblies according to Example 1, Example 2, Comparative Example 2, and Comparative Example 3, each of which included the OER catalyst, showed cell reversal time of more than 3 hours, i.e. excellent reversal tolerance.

Also, it can be seen that, for the membrane-electrode assemblies according to Comparative Example 2 and Comparative Example 3, considerable voltage loss was caused due to the OER catalyst, whereas, for the membrane-electrode assemblies according to Examples 1 and 2, little voltage loss was caused in spite of the OER catalyst included therein.

The invention claimed is:

1. A membrane-electrode assembly comprising:
   an electrolyte membrane having a first surface and a second surface opposite the first surface;
   an anode on the first surface;
   an OER catalyst layer on the first surface; and
   a cathode on the second surface, wherein
   the OER catalyst layer comprises an oxygen evolution reaction catalyst,
   the OER catalyst layer is in contact with the anode, and
   at least a portion of the OER catalyst layer does not overlap the anode in a thickness direction of the OER catalyst layer.

2. The membrane-electrode assembly according to claim 1, wherein the oxygen evolution reaction catalyst comprises $IrO_2$, $RuO_2$, $TiO_2$, $Ir_xSn_{1-x}O_2$ (x being a real number greater than 0 and less than 1), PtIr, IrRu, PtRuIr, or a mixture of two or more thereof.

3. The membrane-electrode assembly according to claim 1, wherein the oxygen evolution reaction catalyst is supported on a carbon-based support.

4. The membrane-electrode assembly according to claim 1, wherein the anode comprises no oxygen evolution reaction catalyst.

5. The membrane-electrode assembly according to claim 1, wherein the anode has a size and a shape corresponding to the cathode.

6. The membrane-electrode assembly according to claim 1, wherein an entirety of the OER catalyst layer does not overlap the anode in the thickness direction thereof.

7. The membrane-electrode assembly according to claim 1, wherein the OER catalyst layer and the anode are arranged side by side on the first surface.

8. The membrane-electrode assembly according to claim 1, wherein the OER catalyst layer is disposed on the first surface so as to surround the anode.

9. A method for manufacturing a membrane-electrode assembly, the method comprising:
   preparing an electrolyte membrane having a first surface and a second surface opposite the first surface;
   forming an anode on the first surface;
   forming an OER catalyst layer on the first surface; and
   forming a cathode on the second surface, wherein
   the OER catalyst layer comprises an oxygen evolution reaction catalyst,
   the OER catalyst layer is in contact with the anode, and
   at least a portion of the OER catalyst layer does not overlap the anode in a thickness direction of the OER catalyst layer.

10. The method according to claim 9, wherein
    the forming the anode on the first surface comprises forming the anode on a first release film; and transferring the anode formed on the first release film to a first region of the first surface,
    the forming the OER catalyst layer on the first surface comprises forming the OER catalyst layer on a second release film; and transferring the OER catalyst layer formed on the second release film to a second region of the first surface, and
    the forming the cathode on the second surface comprises forming the cathode on a third release film; and transferring the cathode formed on the third release film to the second surface.

11. The method according to claim 10, wherein the transferring of the anode, the transferring of the OER catalyst layer, and the transferring of the cathode are simultaneously performed.

12. A fuel cell comprising:
    the membrane-electrode assembly according to claim 1; and
    a separator disposed on the anode and the OER catalyst layer, wherein
    the separator has a fuel inlet, a fuel outlet, and a flow channel between the fuel inlet and the fuel outlet, and
    the OER catalyst layer overlaps at least one of the fuel inlet and the fuel outlet.

* * * * *